United States Patent [19]

Tappe

[11] 3,839,801
[45] Oct. 8, 1974

[54] DENTOMETER
[75] Inventor: Gerald D. Tappe, Yuba City, Calif.
[73] Assignee: Feather River Orthodontic Laboratory, Inc., Marysville, Calif.
[22] Filed: May 9, 1973
[21] Appl. No.: 358,503

Related U.S. Application Data
[63] Continuation-in-part of Ser. No. 261,312, June 9, 1972, abandoned.

[52] U.S. Cl............................. 33/179, 33/174 D
[51] Int. Cl........................... G01b 3/10, G01b 5/08
[58] Field of Search....................... 33/179, 174 D

[56] References Cited
FOREIGN PATENTS OR APPLICATIONS
490,295  1/1930  Germany ............................. 33/179
462,548  7/1928  Germany ............................. 33/179

Primary Examiner—Louis R. Prince
Assistant Examiner—Richard R. Stearns
Attorney, Agent, or Firm—Townsend and Townsend

[57] ABSTRACT

A dentometer that includes a flexible band in the form of closed loop adapted to be drawn snugly about teeth of different sizes, and a body from which said loop projects. A pointer operatively connected with said band scans a dial having indicia designating different perimeters of teeth, directly identifying the perimeter of the tooth within the tightened loop of the band. A member connected with the band is manually movable to tighten the loop about a tooth and an element on the body is adjustable to enable calibrating the pointer and indicia upon replacement of a band or stretching of a band during repeated use. A band including an element connecting both ends thereof is readily replaced or the band may be readily replaced on an element and said element is releasably connected with the aforesaid member.

12 Claims, 17 Drawing Figures

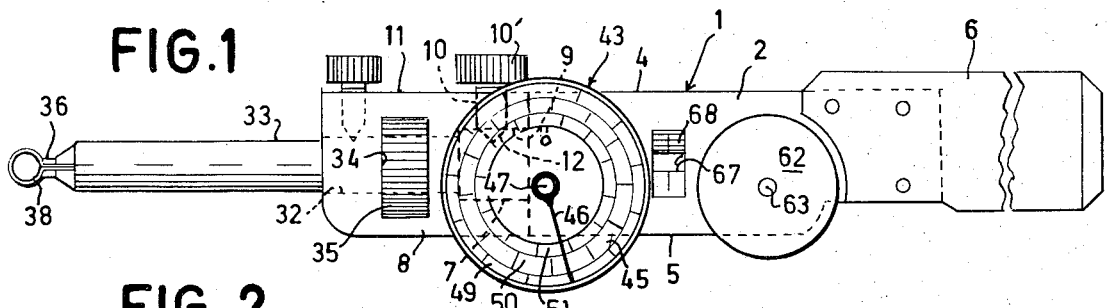
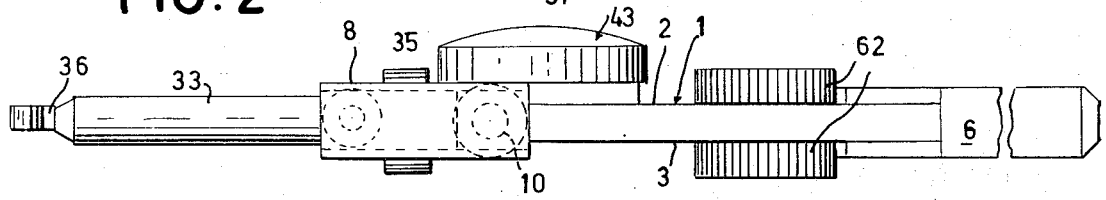
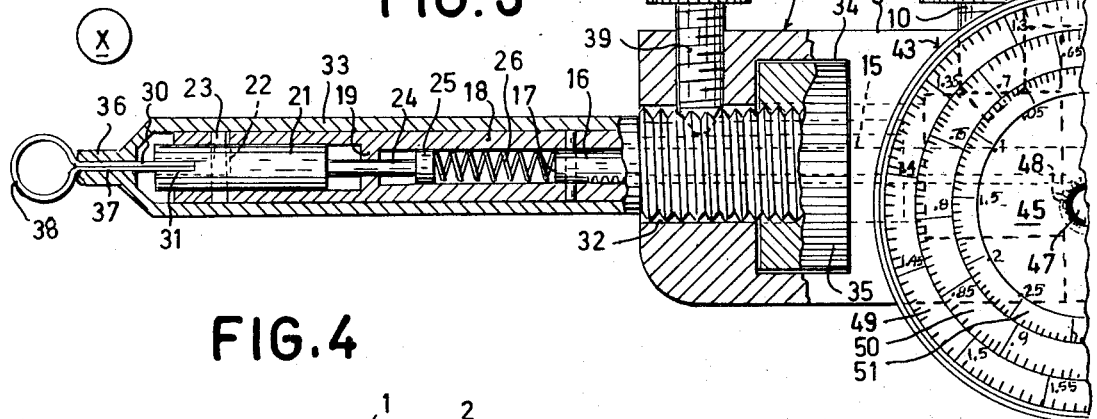
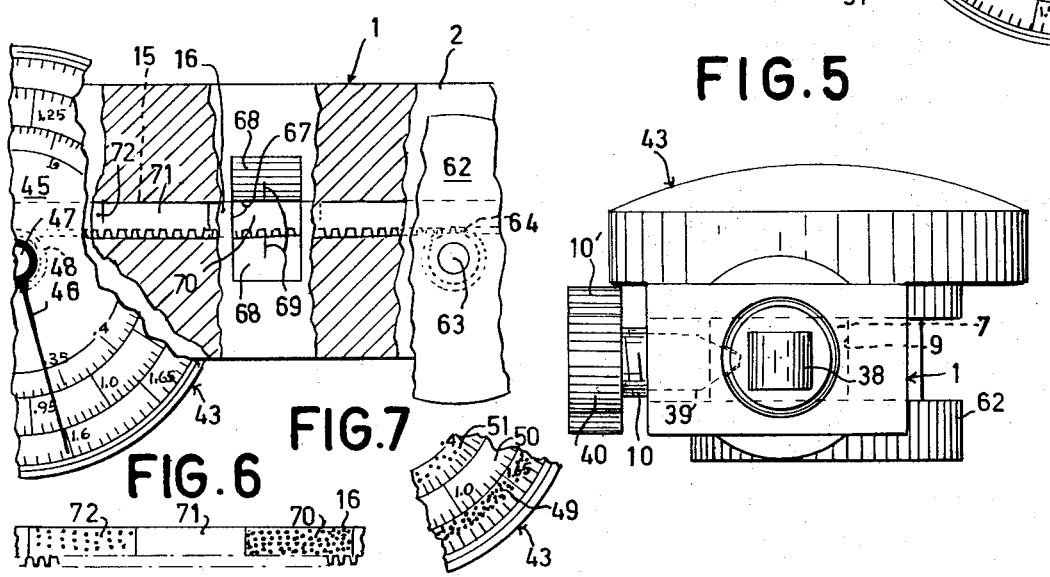

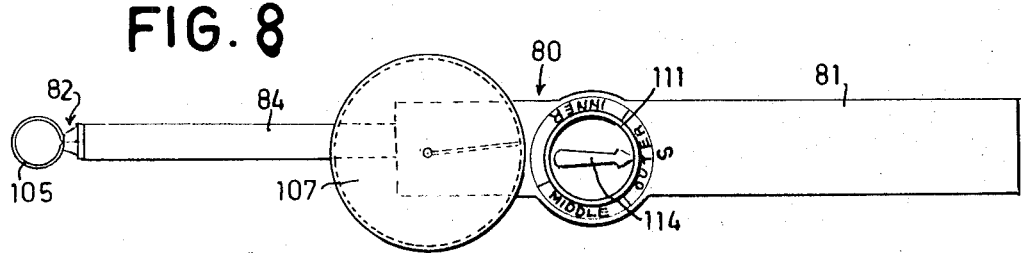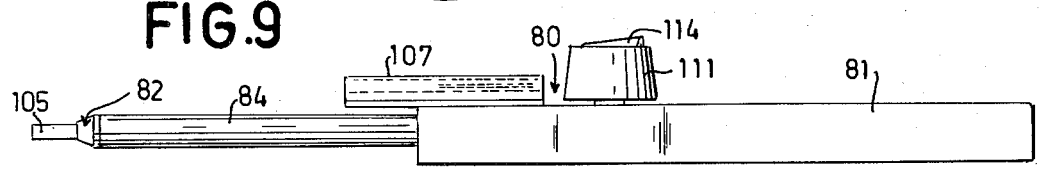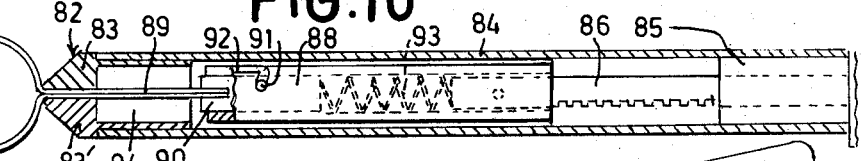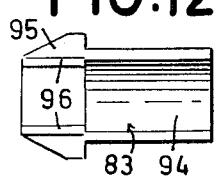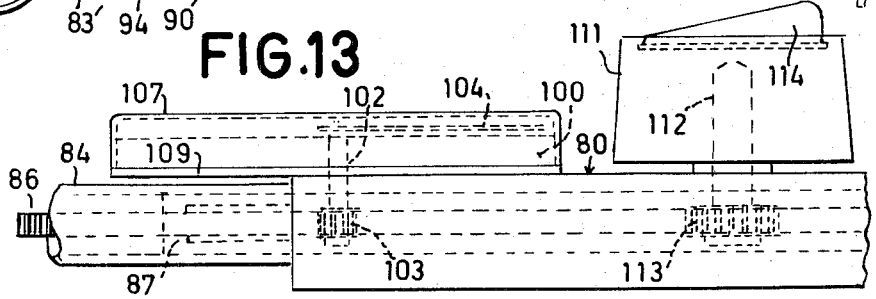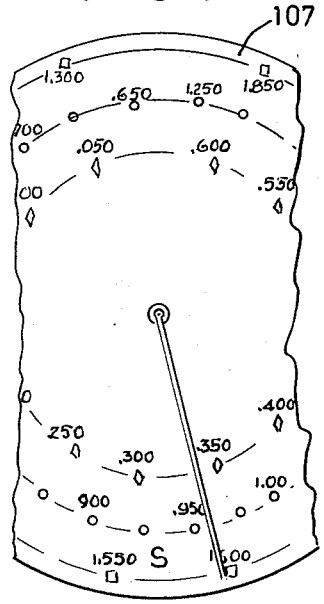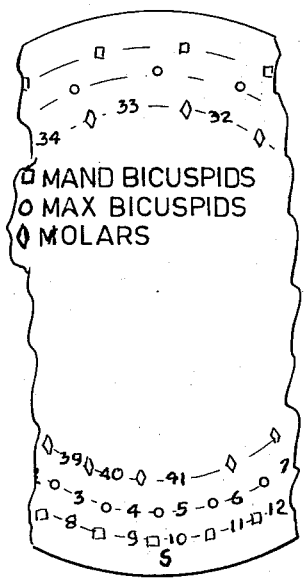

DENTOMETER

This is a continuation-in-part of application Ser. No. 261,312, now abandoned, filed June 9, 1972.

SUMMARY

Early dentometers for use in measuring the perimeters of teeth, employed a thin wire provided with an adjustable loop to encircle a tooth. Later attempts employed a thin band of metal. One end of a wire or one end of the band was fixedly secured to an elongated body or supported on a spool, and the other end was secured to a movable element on the body with a loop of the wire or band projecting from the body for encircling the tooth to be measured. Upon moving the element in one direction the loop would be tightened about a tooth, and a row of graduations extending longitudinally of the elongated body alongside the movable element provided for a reading to be taken between a mark on the element and the graduations.

The principal objections to devices generally of the above type were: the difficulty of obtaining a reading; the difficulty of actuating the dentometers; the lack of accuracy in the measures taken; the lack of means for calibrating the graduations and indicators; the difficulty in replacing the band or wire providing the measuring loop; the difficulty (in the case of wire) of removing the loop from the teeth. Heretofore accurate, clear, direct micrometric readings over an extended range of perimeters covering molars, bicuspids and incisors by a compact dentometer were not possible, and the variations in accuracy due to the stretch of the loop material during use resulted in their abandonment.

Bands for fitting around individual teeth during cementation are provided by different makers or distributors of orthodonic bands, and each maker may have its own designations for bands of different perimeters, which is of little help to the orthodontist in fitting a band in the absence of knowing the perimeter of the tooth around which the band is to fit. The differences in the perimeters of the bands is in micrometric lengths.

The present dentometer hereafter described in detail, provides for easily and quickly obtaining an accurate measure, in inches, of the molars, including the second molars, bicuspids and incisors, on a single dial, and it also provides for quickly replacing a measuring band and for calibrating the dial indicator and dial with the measuring band to insure correct readings for the new band, and to also insure correct readings upon stretching of a band during repeated use.

Where the makers of bands have arbitrary indicia for bands of different sizes, it is obvious that the dial in the present invention which indicates the sizes in inches could be substituted by a dial showing the arbitrary indicia adopted by the manufacturer, or a chart could be provided showing the arbitrary indicia and the corresponding inch size for each.

Among the advantages of being able to select a band of the correct size in the first instance are: (a) the saving of time to making repeated fittings; (b) the delegation of the work of obtaining the measure and selecting a band of the correct size to an assistant; (c) enabling the prewaxing of the band selected by the assistant, thus saving the time of the orthodontist to operations demanding his skill and saving much chair time; (d) the elimination of the inconvenience and pain to the patient due to making repeated fittings of bands in the effort to obtain a band of the correct size.

One of the objects of the present invention is the provision of a dentometer adapted to accomplish the above advantages and one that enables a direct, accurate, clear reading from a compact dial of the perimeter of any of the teeth of a patient upon tightening the measuring band around a tooth, and which readings are direct in micrometric lengths, without the reference to a separate vernier scale.

Another object of the invention is the provision of a dentometer adapted to obtain an accurate perimeter reading of teeth from which preformed bands can be quickly selected for orthodontic banding, and which dentometer has a flexible measuring band in the form of a loop from which a reading is obtained by an indicator operatively connected with the measuring band for movement along graduations on a dial that are identified by indicia designating the perimeter of the loop of the band when the loop is tightened about a tooth, and means is provided for quickly calibrating the indicator with the indicia upon stretching of the loop or misadjustment.

A still further object of the invention is the provision of a dentometer having a flexible band in the form of a loop adapted to be tightened about the tooth to be measured, and a structure enabling quick replacement of the band and a quick setting of a pointer connected with the band relative to a dial, upon such replacement, or stretch of a band, to enable a direct, clear and highly accurate reading on the dial of the perimeter of the loop at all times.

Other objects and advantages will appear in the description and drawings.

DESCRIPTION OF DRAWINGS

FIG. 1 is a top plan view of the device, partly broken in length to accomodate the view to the sheet.

FIG. 2 is a side elevational view of the device shown in FIG. 1.

FIG. 3 is a greatly enlarged, fragmentary, part sectional, part plan view of the left hand portion of the device shown in FIG. 1.

FIG. 3a is a top plan view of a cylindrical disc of known circumference that is adapted to be used in calibrating the device.

FIG. 4 is an enlarged, fragmentary, part sectional, part plan view of the portion of the device adjoining, but not shown, in FIG. 3.

FIG. 5 is an enlarged end view of the device of FIG. 2.

FIG. 6 is a fragmentary, enlarged, plan view of the rack indicated in FIG. 4, separate from the device, showing three adjacent zones of different identifying characteristics.

FIG. 7 is a fragmentary, enlarged, plan view of a portion of the dial of FIGS, 1, 3, and 4 showing three bands of graduations having identifying characteristics corresponding to those in the portion of the rack shown in FIG. 6.

FIG. 8 is a top plan view of a modified form of the invention.

FIG. 9 is a side elevational view of the device shown in FIG. 8.

FIG. 10 is an enlarged, fragmentary, part elevational and part cross-sectional view, of the portion of the device that extends from and includes the measuring band, and a portion of the size indicating dial.

FIG. 11 is a greatly enlarged front view of the nose of the device of FIG. 9.

FIG. 12 is an enlarged, elevational view of one side of one of the nose pieces.

FIG. 13 is an enlarged, fragmentary view of a portion of FIG. 9.

FIG. 14 is a greatly enlarged, fragmentary, top plan view of size indicating dial showing coded band sizes.

FIG. 15 is a view similar to that of FIG. 14 showing actual band sizes.

FIG. 16 is a view similar to that of FIG. 15, but showing other band sizes.

DETAILED DESCRIPTION

The main body of the dentometer is generally designated 1, and is horizontally elongated, as viewed in FIGS. 1, 2 and of oblong cross-sectional contour (FIG. 5) providing a flat upper side 2 and a flat lower side 3 and lateral edges 4, 5.

One end of body 1 is secured to a horizontally extending handle 6 by rivets or any other suitable means, while the opposite end of the body is of reduced width forming a short longitudinally projecting central tongue 7 (FIG. 1).

An extension 8 of the body member 1 is formed with a socket 9 (FIGS. 1, 5) in which the tongue 7 is removably fitted. A screw 10 threadedly extends through an opening in one edge 11 of the extension 8 to the tongue 7, said edge being preferably flush with the edge 4 of the body 1. A finger engageable head 10' on said screw is for manually tightening the screw against the tongue 7, and the terminating tapered end portion of said screw is adapted to extend into a complementarily formed notch 12 (FIG. 1) in said tongue for securely, but releasably, locking the extension 8 to the body 1.

The body 1 and extension 8 are formed with a passageway 15 extending longitudinally of the body, and a rack 16 extends into said passageway from approximately the end portion of the body that is at handle 6, to a point 17 (FIG. 3) spaced outwardly of the extension 8, where it is secured within one end of a cylindrical sleeve 18. Said end of the sleeve 18 is its inner end as distinguished from its outer end, the latter being remote from body 1.

The sleeve 18 is formed with a radially inwardly projecting flange 19 (FIG. 3) intermediate the ends of its bore and the inside diameter of the sleeve extending between the flange 19 and its outer end is preferably greater than the portion extending from the inner end to said flange.

A cylindrical element 21 is slidable and rotatable within outer end of said sleeve that is outwardly of flange 19. The outer end of the sleeve 18 is open and the opposite sides of said outer end are formed with right angle slots, with one leg of each slot extending to and opening outwardly of the terminal outer end of sleeve 18, and with one of each extending in the same direction circumferentially of the sleeve. A pin 23 (FIG. 3) extending transversely through element 21 projects at its ends into said slots, thereby providing a bayonet coupling between the element and the sleeve 18 at the outer end of the latter.

A short rod 24 slidably extends through the restriction in the bore of the sleeve at flanges 19, and a head 25 on said rod is within the smaller diameter end of the sleeve. A spring 26 reacts between head 25 and the end of rack 16 that is secured in the inner end of said sleeve to yieldably urge the ends of pin 23 on element 21 into seats at the ends of the circumferentially extending legs of slots 22 for yieldably holding the element 21, against accidental rotation relative to the sleeve.

The opposite ends of a thin metal band 30 are secured by any suitable means in a transversely extending, axially outwardly opening slot 31 (FIG. 3) formed in the outer end of the cylindrical element 21. The ends of said band may be held by readily meltable solder, and a replacement secured in slot 31, or the element 21 with a band secured therein may replace a worn band as a unit. The element 21 and the band are readily removed from the sleeve 18 upon removal of extension 8.

The extension 8 of the body 1, as has been explained, is readily removable from the body 1 upon loosening the screw 10. Said extension is formed with an opening 32 (FIG. 3) that is in longitudinal alignment with the passageway 15 for rack 16. This opening is of relatively large diameter and is adapted to pass the exteriorly threaded inner end of cylindrical, elongated barrel 33 for axial movement of the barrel relative to the extension 8. An opening 34 of rectangular contour is formed in said extension 8 through its flat opposite sides and a circular nut 35 having milled outer edges is positioned in said opening with the threaded inner end of the barrel 33 being in threaded engagement with the threads of the nut and the nut projecting from opposite sides of the extension for rotating the nut by the fingers of a hand. Upon such rotation, the barrel 33 would be moved either outwardly or inwardly relative to the body 1 according to the direction of rotation of the nut 35.

Barrel 33 extends outwardly from the extension 8 beyond the outer end of sleeve 18 and its outer end is formed with a short axially outwardly projecting nose 36 having a relatively thin slot 37 (FIG. 3) formed therein for outward passage of band 30 outwardly of said nose 36. The projecting end of band 30 is adapted to be readily formed into a loop 38 to encircle a tooth, and the portion of the band forming said loop is readily flattened to pass through, or to be withdrawn through, slot 37.

Upon rotation of nut 35 in one direction, the loop 38 will be contracted, and upon rotation in the opposite direction it will be expandable. Thus contraction of the loop will be independent of the movement of the rack 16, as will the expandability of the loop.

A lock screw 39 having a head 40 for manual rotation of the screw, extends through a threaded opening in the extension 8 to the threaded end of the barrel 33, and into a groove in the side of said threaded end of the barrel that extends longitudinally of the barrel for locking the barrel stationary relative to the body after adjustment of the degree of extension of the barrel. Also said screw, when loosened, prevents rotation of the barrel upon rotation of nut 35, functioning as a spline during movement of the barrel.

Upon loosening the screw 10, the extension 8 carrying barrel 33, screw 39 and nut 35 may be slipped as a unit off the sleeve 18, the loop being flattened as it is drawn through the slot 37 in nose 36. Thereafter, a quarter turn of the element 21 relative to sleeve 18 will release the element 21 and band 30, as a unit for replacement of the band 30 in element 21 or for replacement of the element having a band thereon.

Rack 16 is formed with teeth along one side, and body 1 has a gauge generally designated 43 secured thereto by any suitable means. Said gauge has a circular dial 45 thereon. An indicator arm 46 over dial 45 is secured on one end of a shaft 47. This shaft extends centrally through the dial and has a gear 48 secured thereto, the teeth of which are in mesh with the teeth of rack 16 (FIG. 3) whereby longitudinal movement of the rack 16 will rotate shaft 47 for scanning of the dial.

Dial 45 has concentrically disposed annular rows of graduations on its face, each row being in an annular band concentric about shaft 47. Three such bands, 49, 50, 51, are shown in FIGS. 1, 3, 4 and 7.

Coaxial finger actuatable wheels 62 (FIGS. 1, 2, 4) of a pair are disposed at the top and bottom sides of body 1 and are secured on a shaft 63 that, in turn, is journalled for rotation in body 1. A gear 64 on shaft 63 has its teeth in mesh with the teeth on rack 16 (FIG. 4). The position of said wheels is adjacent handle 6 where they are readily engaged by the thumb of a hand grasping the handle for rotation of the wheels and shaft 63 in one direction or the other for taking up the slack in the loop 38 or for loosening the latter, and for holding the loop stationary at any condition of the loop.

Upon rotation of the wheels 62 and consequent movement of the rack 16, the pointer 46 scans the rows of graduations, which are omitted from the dial of FIG. 1 to avoid confusion but are indicated in FIGS. 3, 4. As seen in FIGS. 3, 4, the main division marks of the graduations in the inner row 51 are identified by indicia representing fractions of inches such as 0.35, 0.4, etc., with ten subgraduation marks between the division marks. These main division marks in the inner row 51 commence at one end with 0.05 and end with 0.6 while the main division marks of the intermediate row 50, commence with 0.65 and end with 1.25 and the outer row 49 commences with 1.3 and ends with 1.85. The rows of divisions extend for 360 degrees providing a continuity between the end of one and the beginning of the adjacent row. Thus, when a loop 38 is formed and is contracted about a tooth, the position of the indicator arm 46 relative to the graduations will clearly designate the perimeter of the loop 38 along one of the three rows of graduations.

The face 2 of the body 1 is formed with an opening 67, through which a section of the rack 16 is exposed (FIGS. 1, 4) and the surface 68 at two opposite sides of the rack are inclined to the rack, with indicator lines 69 on said inclined surfaces centrally between the ends of the opening 67.

The surface of the rack 16 exposed through opening 67 is flattened and three adjoining zones 70, 71, 72 extend longitudinally of the rack are adapted to move across said opening, in succession, as the rack is moved longitudinally thereof in one direction or the other during three revolutions of the pointer or indicator 47 around the dial three times, commencing with the indicia of largest value in band 49 and ending at a point between the indicias of the largest and smallest values in inner band 51.

The length of zone 70 on rack 16 (FIG. 6) corresponds to the length of travel of pointer 46 during one revolution of the latter, and the lengths of zones 71, 72 respectively correspond to the lengths of travel of pointer 46 during a second and third revolution of the pointer 46, each revolution commencing with the position of the pointer at a zero indicia on the dial positioned adjacent the inner band (FIG. 1).

The zones 70, 71, 72 each have a visually distinguishing characteristic from the others, and the band 49 has the same visual characteristic as zone 70, while zone 71 corresponds to band 50 and zone 72 corresponds to zone 51 (FIGS. 6, 7).

To avoid confusion in the drawings, the distinguishing characteristics are not indicated on the dials of FIGS. 1, 3, and 4. These distinguishing characteristics may be in color. For purpose of example, the band 49 and zone 70 may be yellow. Band 50 and zone 71 may be white, and band 51 and zone 72 may be red. By this means the operator in taking a measure of a tooth, upon seeing the white zone 70 on the rack at opening 67 will instantly know that the reading applying to the loop 38 will be taken at the pointer along the white band 50. If the zone exposed is red, the reading will be taken along the red band, and if it is yellow the reading will be taken along the yellow band.

To accurately calibrate the indicator and dial with the size of the loop, it is only necessary to contract the loop 38 about a body of known circumference, such as shown in FIG. 3a, and to adjust the extension of the barrel 33 so that the pointer 49 will point to the indicia on the dial that designates that circumference.

The body marked X in FIG. 3a, for example, is ½ inch in diameter, or with a circumference of 1.5708. As seen in FIGS. 1 and 6, the pointer 46 indicates substantially 1.571. The device will now accurately designate the circumference of any tooth about which it is contracted, thus enabling the operator to immediately select the proper size of band for the tooth so measured.

The bands 36 provided for measuring are quite thin, and during repeated use will stretch, thereby resulting in errors in reading unless the dial and pointer are recalibrated to a known circumference. This recalibration is quickly and easily accomplished by reinserting the disc X of known circumference in the loop and contracting it about said disc. The screw 39 is then loosened, and nut 35 actuated to move the barrel 33 and nose 36 longitudinally of the barrel to the distance at which the pointer 49 indicates the circumference of the disc, after which the screw is tightened and accuracy in the reading is restored.

The same steps are used where a new or substitute band 36 replaces an old one.

By the structure hereinabove described, it is seen that the loop 38 may be contracted and expanded by movement of the rack 16 through actuation of the finger engageable wheel or wheels 62, but in the calibrating step, once the loop is formed to a known circumference the rack may be adjusted to calibrate the indicator and dial to that circumference by moving the barrel 33, loop 38 and rack 16 as a unit independently of the rack moving means 62, and then locking the barrel 33 in the adjusted position for taking future measures through actuation of the wheels 62.

The dial and single pointer provides for a direct, quick, single reading of micrometer accuracy at one point along graduations identifying the perimeter of any tooth encircled by the loop 38 from the smallest to the largest, and which reading is in indicia directly identifying the size of the band to be selected for positioning around the measured tooth.

The bands 49, 50, 51 may also be designated "strips" to avoid confusion with the band 30.

Insofar as the element X of FIG. 3a is merely a device of known circumference, it is obvious that the loop may be tightened about any article having a known circumference within the range of the graduation on dial 45, and the loop adjusted to that circumference.

In the modification disclosed in FIGS. 8–13 the main body, generally designated 80, includes a manually graspable, elongated handle 81 at one end and a nose portion 82 at the opposite end. The nose portion itself is in two pieces, 83, 83'.

The body itself, in the present form has three outer or exposed main pieces that are separable from each other, namely: the handle 81, a tubular, removably supported extension 84 in longitudinal alignment with the handle, and the nose piece 82, which pieces are substantially in longitudinal alignment along the longitudinal axis of the handle (FIGS. 1, 2).

One end portion of handle 81 is graspable for holding in a hand, the same as for handle 6 in FIG. 1, and one end of the extension 84 abuts the other end of the handle, while the pair of nose pieces 83, 83' is releasably held in the outer end of the extension 84 (FIG. 10).

Rigidly supported within the handle 81 and projecting from the end adjacent the tubular extension 84 is a tube 85. The extension 84 is frictionally and slidably supported on the projecting end of tube 85.

A rack 86 (FIGS. 10, 11) slidably extends into tube 85 through a bearing 87 in the projecting end that supports extension 84. The bearing 87, in turn, positions the rack 86 with its teeth facing laterally and the rack projects from tube 85 longitudinally thereof.

The words "outer" and "inner" as used herein, and "forward" and "rearward" and words of similar import, are generally used with reference to the handle, the outer end of which, for example, abuts the inner or rear end of extension 84.

The end of the rack projecting forwardly from tube 85 is secured within the rear end of a tubular sleeve 88 (FIG. 10) that substantially corresponds to sleeve 18 in FIG. 3.

A thin, flexible band 89 substantially corresponding to band 38 in FIG. 3 has its ends secured within the forward end of a relatively short, cylindrical element 90 (FIG. 10). Element 90 is releasably secured within the outer or forward open end of sleeve 88 by a bayonet type coupling, said element 90 having a radially outwardly projecting pin, the projecting ends 91 of which slidably enter slots 92. One of the ends of said slots open outwardly of the terminal outer end of sleeve for entry of the ends 91 of the pin and the inner ends of the slots 92 extend generally circumferentially of the sleeve for seating the ends of the pin at the terminal ends of said circumferentially extending ends of said slots. Spring 93 reacts between the end of rack 86 that is within sleeve 88 and element 90 to prevent accidental rotation of the element relative to the sleeve. This structure is common to both forms of the invention herein disclosed.

When the element 90 with the band 89 secured thereto is positioned and secured within the forward end of sleeve 88, the closed end of the band will project out of the outer open end of the tubular extension 84.

The nose pieces 83, 83' are then inserted into the open outer end of the extension 84 at opposite sides of the legs of the band. Each of the halves 83, 83' has a semi-cylindrical portion 94, that extends into the outer end of the extension 84, in sufficient frictional engagement with the cylindrical inside surface of said extension to releasably hold the halves in extension 84.

The outer end portions 95, 95' respectively of the halves 83, 83' project outwardly of the outer end of extension 84, when the semi-cylindrical portions 94 are frictionally secured within said extension. A shoulder is formed on each half of the nose pieces at the juncture between the semi-cylindrical portions and the outer end portions to abut the free outer end edge of the extension 84 when the nose pieces are in position within said extension.

The outer end portions 95, 95' are solid, with their outer surfaces extending convergently in a forward direction, and the surface of portion 95 that faces the band 89 is formed with a pair of spaced, parallel ridges 96 (FIG. 11) along and parallel with the opposite edges of the band 89, while the surface on portion 95' facing the ridges is formed with couplementary recesses for receiving said ridges. The band 89 extends between the ridges from within the extension 84 to a distance projecting outwardly of the nose pieces. Thus the ridges not only provide guides for the band, but constitute the narrow lateral sides of the flattened passageway between the ridges through which the band extends.

The removable pair of nose pieces between which the face-to-face engaging portions of band 89 extend greatly facilitates the assembly of the nose portion of the device after the band is installed, making it unnecessary to flatten the band and to thread it through the nose piece when element 90 is attached thereto. It also enables the use of bands of different thicknesses without danger of breaking the bands, and facilitates precision casting of the nose piece.

Adjacent the end of the handle abutting the extension 84 is a circular dial support 100 (FIG. 12). This support is rigidly secured to the handle by screws or any other suitable means.

A shaft 102 rotatably supported in the handle extends centrally through the dial support 100 and projects from the outwardly facing surface of the latter. The portion of shaft 102 within the handle has a pinion 103 secured thereon, the teeth of which are in mesh with the teeth of the rack 86. Tube 85 is formed with an opening in one side providing access to the teeth on the rack.

Shaft 102 (FIGS. 8, 12) projects above the support 100 and a pointer 104, corresponding to pointer 46 (FIG. 1) is frictionally secured on the upper end of the shaft 102 in approximately the same manner as is used for supporting one of the hands of a watch.

Suitable bearings in the support 100 and within the handle support shaft 102 in a position with the teeth of pinion 103 in mesh with the teeth on the rack 86.

The portion of band 89 that projects outwardly of the tip is in the form of a loop 105 to be tightened around the tooth to be measured, as will later be explained, and the actual dial carrying the indicia indicated by the pointer for designating the size of the band to be used for encircling said tooth, is in the form of a transparent circular disc 107 having an axially extending flange adapted to frictionally engage the circular sides of support 100. A radially extending flange 109 around the base of said support is engageable by the free edges of said axially extending flange to support the disc 107 spaced above the pointer 104.

There may be several of said dials, each of which preferably has several rows of indicia thereon readable from the outer side of the dial. Each of the different dials may bear different indicia representing the code sizes of bands adapted by each of different makers of bands. The dial of FIG. 14 bears indicia representing the actual uncoded perimeter, and substantially corresponds to the dial in FIG. 3.

Adjacent the dial support 100 on handle 81 is a manually rotatable button 111. This button may be cylindrical with finger engageable ribs on its outer surface, and it is secured on a projecting end of a shaft 112 that is parallel with shaft 102. Shaft 112 is supported for rotation in bearings within the handle, with one end of the shaft projecting from the same side of handle 81 as shaft 102, the button being on its projecting end.

A pinion 113 (FIG. 12) secured on shaft 112 is within said handle, and a side of tube 85 is formed with an opening through which the teeth on the pinion pass to engage the teeth on the rack 86. The pinions 103, 113 are preferably proportioned to have a 3 to 1 ratio, whereby one revolution of the finger engageable button 111 will effect three revolutions of pointer 104.

The button 111 rotatably carries a finger engageable indicator element 114. Preferably said indicator element is on the upper axially facing surface of the button and is readily rotatable by the thumb and forefinger of a hand to point in one of several different directions, and the frictional resistance to such rotation is sufficient for it to move with the button when the latter is rotated without dislodging its adjusted position on the button (FIGS. 8, 13).

The operation of the form shown in FIGS. 8–13 in that the rotation of button 111 effects expansion and contraction of the loop 105. Also said rotation moves the pointer 104 relative to the dial to indicate the correct band size for use on the tooth being measured. In both forms of the invention, the indicia on the dial are related to a known standard perimeter such as may be established by the element X in FIG. 3a.

The dentometer of FIGS. 8–13 is simpler and more economical to make than that of FIGS. 1–7 and the provision of the separate dials enables the user, who may have bands of different makers, to directly determine the correct code designated band of any maker without referring to a chart for translating the code size to millimeters or inches, or vice versa.

For example, in FIG. 14 actual perimeter measures are designated, and the dial 107 will be positioned on the support 100 so that the pointer 104 will be over the letter S shown on the dial. When in this position, with the loop 105 of a perimeter equal to that of the element, which is, say, 1.571 in the outer row of indicia, or the perimeter of the slug X of FIG. 3a which has a diameter of one half inch.

Furthermore, the indicator 114 on the button 111 will be set to point to the letter S on the portion of the handle around the button (FIG. 8) as indicated at 115. The letter S is in the segment 116 which is marked "OUTER". The other segments 117, 118 around the button are designated "MIDDLE" and "INNER". Any other suitable designations may be used to identify the several segments.

After the dial is positioned as above described and after the indicator 114 is set and the loop 105 is positioned around a tooth and is tightened around the perimeter, the reading in the row of indicia that is designated by the position of the indicator 114 will give the correct size of the band to fit the tooth.

In FIG. 15 the code sizes of bands for one maker are shown. These are arranged on the dial relative to the letter S as described for FIG. 13, and the code numbers in the several rows correspond to the sizes in the dial of FIG. 14. Hence the coded bands can be directly selected from the reading on the dial.

FIG. 15 illustrates a slightly more extensive and differently coded band but the principle is the same.

Also, as seen in FIG. 15 the symbols between figures in each row on the dial may identify the code numbers with the teeth measured. The symbols between the numbers may indicate the row in which the reading is to be taken, the row being also related to the particular teeth that normally will be within the size range of the outer, middle and inner row, as also indicated on the dial itself.

FIG. 16 may go further by relating the coded size number to teeth in the upper and lower jaws, as indicated on the dial.

The user of the dentometer merely positions on the dial support the dial that corresponds in size designations to the code sizes identifying the particular bands used.

When band 89 stretches, as it does through use, it is only necessary to rotate the dial upon testing it with a known diameter slug X in loop 105 so the pointer is over the symbol S and the device will subsequently correctly indicate band sizes for teeth.

Thus the form described in FIGS. 8 to 16 provide for direct reading of band sizes of bands in systems having different identifying symbols for sizes. Also the pointer rotating member indicates the row of size symbols in which a reading is to be taken. Further the removable nose pieces greatly facilitate replacement of bands and enables use of bands of different gauges free from the breakage hazard.

I claim:

1. A device for measuring the perimeters of teeth comprising:
   a. an elongated body including an elongated handle at one end thereof, a nose portion at the opposite end formed with an opening for a measuring band, and an elongated tubular barrel between said handle and said nose portion carrying said nose portion at its end opposite to said handle;
   b. supporting means on said handle removably supporting said barrel in longitudinal alignment with said handle;
   c. a continuous passageway extending from said opening through said barrel and said supporting means and into said handle to a point spaced from but adjacent the end of said handle remote from said supporting means;
   d. a tooth measuring band of thin, flexible material projecting outwardly of said nose portion for forming a loop adjoining said nose portion for encircling the tooth to be measured, and said band having terminal end portions in side-by-side adjoining relation extending through said opening into said passageway;

e. loop-contracting-and-expanding means connected with said end portions supported within said passageway for movement longitudinally of the latter in one direction for drawing the loop portion of said band into said opening for contracting the loop about the tooth to be measured, and for movement in the opposite direction to expand said loop;

f. manually actuatable means supported on said handle for movement in opposite directions connected with said loop-contracting-and-expanding means for moving the latter in one direction or the other longitudinally of said passageway according to the direction of movement of said manually actuatable means;

g. a dial on said body having an annular row of indicia thereon serially designating loop sizes of different perimeters and an indicator operatively connected with said loop-contracting-and-expanding means for movement along said row upon movement of said loop contracting and expanding means to move to and stop in a position at or closely adjacent to the symbol designating the perimeter of the tooth encircled by said loop when said loop is tightened around said tooth.

2. The device as defined in claim 1, further including:

h. said loop-contracting-and-expanding means including a rack within said passageway extending longitudinally thereof and reciprocable therein, and a rotatably supported pinion in said handle having its teeth in engagement with the teeth of said rack, and connecting means for connecting said terminal end portions of said loop to one end of said loop-contracting-and-expanding means, and i. said manually actuatable means including a pinion in operative engagement with said rack and a rotatable finger engageable member on said handle connected with said pinion for rotating the latter for thereby effecting said movement of said rack and movement of said indicator.

3. The device as defined in claim 1, further including;

h. said annular row being one of several concentric annular rows on said dial, and i. the indicia in each row being a group of symbols respectively identifying the perimeter of different sizes.

4. The device as defined in claim 3, further including:

j. means located on said body fixed relative to said manually actuatable means and cooperating with said loop-contracting-and-expanding means for designating the row of symbols in which the reading of size applicable to the tooth encircled by said loop is to be taken.

5. A device for obtaining an accurate, micrometric measure of the perimeter of teeth comprising:

a. a body that comprises an elongated main body portion and an elongated barrel in longitudinal alignment therewith and a nose portion on the outer end of said barrel relative to said main body portion having an opening formed therein;

b. a continuous inner passageway within said body extending longitudinally thereof through said barrel from said opening and into said main body portion to approximately the end of said main body portion opposite said nose portion;

c. a tooth measuring band of thin, flexible material in the form of a loop outwardly of and adjacent said nose portion and said band having terminating end portions one on the other extending through said opening into said passageway;

d. an elongated rod supported within said passageway for movement longitudinally thereof in opposite directions, connected at one of its ends with said terminating end portions by connecting means e. rod moving means connected with said rod manually actuatable for moving said rod longitudinally thereof for contracting said loop by drawing the loop portion of said band into said passageway when said rod is moved away from said opening and for expanding said band when said rod is moved toward said opening;

f. a dial stationary on said main body portion having an annular row of symbols designating different perimeters of said loop portion when contracted and expanded;

g. indicator means supported over said dial centrally of said annular row for movement along the symbols of said row, and indicator actuating means connecting said indicator means with said rod for so moving said indicator upon movement of said rod longitudinally thereof in one direction or the other, said indicator and said symbols being calibrated relative to the connection between said rod and said indicator for designating the symbol defining the perimeter of said loop at each position of said rod during its movement in said passageway.

6. The device as defined in claim 5, further including:

h. said barrel and nose portion being detachably mounted on said main body portion for removal therefrom.

7. The device as defined in claim 6, further including:

h. said nose portion comprising a pair of separable pieces each forming one side of said opening through which said end portions of said band extend and forming a portion of said passageway when in assembled position in said outer end of said barrel;

means for removably supporting said pieces in said outer end of said barrel in said assembled position; and j. means including said rod for moving said nose piece out of said barrel for replacing said band and said connecting means while said barrel is supported on said body.

8. The device as defined in claim 7, further including:

k. supporting means carried by said main body portion for removably supporting said barrel and said nose portion thereon including means for longitudinally adjusting the position of said barrel with respect to said main body portion;

l. said connecting means including an element releasably connected with said rod secured to said end portions of said band; and m. said element being movable upon movement of said rod in a direction outwardly of said body to an exposed postion at the outer end of said barrel after said nose piece has been removed from said barrel for manual manipulation of said element to release it from said rod to enable said replacement thereof while said barrel is supported on said body.

9. The device as defined in claim 5 further including:

h. said row of symbols being one of several concentrically disposed spaced rows respectively identifying a continuity of progressively increasing perimeters of teeth to be measured from one row to the next whereby a reading of the symbols indicated by said indicator for different perimeters of teeth within a predetermined range will be taken from symbols in one row and for perimeters of teeth within a different range from symbols in another of said rows.

10. The device as defined in claim 9, further including:

i. means on said main body portion cooperating with said rod moving means for visually designating the row of symbols within which the perimeter of the tooth measured by the loop is indicated by said indicator when said loop is tightened about said tooth.

11. The device as defined in claim 9, further including:

i. said rows of said symbols being in annular strips of visually different characteristics to distinguish one row from the other;

said rod moving means including separate zones of characteristics each corresponding to the characteristics of one of said strips; and k. a viewing opening at a fixed point along said body through which one of said zones is exposed when said loop is tightened about the tooth to be measured for designating the strips of the same characteristic in which the reading of the perimeter is to be taken.

12. A device for measuring the perimeters of teeth comprising:

a. an elongated body having a handle at one end and a nose portion at the opposite end having an opening therein for slidable passage of the terminal ends of a loop forming band therethrough, and a continuous, elongated passageway extending from said opening into said handle;

b. a rack supported within said passageway for reciprocal movement longitudinally of the latter;

c. a tooth measuring band of thin, flexible material projecting outwardly of said nose portion for forming a loop outwardly of and adjoining said nose portion for encircling the tooth to be measured, said band having terminal end portions in side-by-side adjoining relation slidably extending through said opening into said passageway;

d. connecting means within said passageway connecting said end portions with one end of said rack, whereby said loop when formed will be expanded for positioning about a tooth to be measured when the rack is moved toward said opening and will be contracted about said tooth upon movement of said rack away from said opening when said tooth is within said loop;

e. a dial support defining an axis mounted on said body and indicating means rotatably supported on said body in a position for movement in an annular path about the axis of said dial support to different perimeter indicating positions;

f. manually actuatable means operably connecting said indicating means with said rack for rotating of said indicating means in said annular path in one direction or the other according to the direction of movement of said rack;

g. a dial rotatably supported on said dial support for movement about the axis of said dial support, said dial having a plurality of symbols about said axis representing the perimeter of said loop, including a setting symbol identifying the perimeter of a member having a known perimeter, and symbols of the plurality thereof other than said setting symbol identifying perimeter sizes relative to said known perimeter, whereby said dial, when rotated on said support to a position in which said indicating means coincides with the position of said setting symbol and said loop is at said known perimeter, will be in a position for correctly measuring the perimeter of any tooth about which the loop is contracted irrespective of variations in the length of said band due to stretching or differences in code designations of perimeter defining symbols.

* * * * *